United States Patent [19]

Mancini et al.

[11] Patent Number: 4,870,261

[45] Date of Patent: Sep. 26, 1989

[54] METHOD AND A DEVICE FOR OPENING DOORS OR THE LIKE, THE DEVICE COMPRISING AN ELECTRONIC CONTROL WITH COMBINATION OF CONSENT AND OPTICAL COMPARED READING

[75] Inventors: Maria Mancini, Milan; Carlo Gasperi, Verona, both of Italy

[73] Assignee: Duto S.p.A., Verona, Italy

[21] Appl. No.: 120,996

[22] Filed: Nov. 16, 1987

[30] Foreign Application Priority Data

Nov. 20, 1986 [IT] Italy ............ 22410 A/86
Oct. 13, 1987 [IT] Italy ............ 84976 A/87

[51] Int. Cl.[4] ............ G06K 5/00

[52] U.S. Cl. ............ 235/382; 235/487; 235/489

[58] Field of Search ............ 235/487, 489, 382.5, 235/382

[56] References Cited

U.S. PATENT DOCUMENTS 3,480,763 11/1969 Gantner ............ 235/489
3,821,704 6/1974 Sabsay ............ 235/382.5

FOREIGN PATENT DOCUMENTS 2752106 5/1979 Fed. Rep. of Germany .
3426508 7/1984 Fed. Rep. of Germany .

*Primary Examiner*—Harold I. Pitts
*Attorney, Agent, or Firm*—Notaro & Michalos

[57] ABSTRACT

The invention relates to a method for opening doors, safety apparatus and the like, and to an electronic control device in which at least two cards are employed. Each card is provided with identifying elements, which are arranged in the same manner as in the other cards. One card has to be inserted in the internal part of a reading unit which is mounted on the system to be controlled, this card being thus provided with hte combination for the system itself. The other card may be inserted in a further reading unit which is identical with the first one and is accessible from the outside. If identical reading combinations are detected on comparing both series of identifying elements, positioned on the movable cards in an identical manner, a consent signal is emitted for actuating the opening mechanism.

11 Claims, 3 Drawing Sheets

METHOD AND A DEVICE FOR OPENING DOORS OR THE LIKE, THE DEVICE COMPRISING AN ELECTRONIC CONTROL WITH COMBINATION OF CONSENT AND OPTICAL COMPARED READING

BACKGROUND OF THE INVENTION

The invention relates to a method for opening safety doors, safety apparatus and the like. This method consists in comparing two series of identifying elements which are arranged on suitable bearings or cards to be inserted in reading units.

The prior art in the field of the control systems for opening safety doors or the like discloses some mechanical, electromechanical and electronic methods which may be computerized, for instance for codifying magnetic bands. However the said codifying operations are expensive and difficult, and involve a complicate laying and a constant maintenance by skilled personnel. Moreover in general these systems present fixed combinations. Therefore these combinations are not modifiable in practice, unless persons skilled in this field intervene to that effect. In other systems there is provided an electronic control device in which the storing is made by digitizing a predetermined combination on a keyboard. This kind of solution permits the combination to be changed when necessary, however it has the inconvenience that a user may forget a stored combination and will be no more able to actuate the opening mechanism.

SUMMARY OF THE INVENTION

These inconveniences and further ones are removed by employing the present invention which concerns a method for opening a safety mechanism. This method allows for a very great number of combinations to be used by employing several matrixes, each of them being coupled with a "key". This method provides a very simple, unexpensive electronic control device the peculiarity of which is that the combination is personal, in fact a user can change the combination at any moment without applying to an expert.

The invention relates to a method for opening doors or the like, characterized in that for comprehending a reading device which is mounted preferably on the inner side of the mechanism to be actuated; the said reading device comprises means for identifying reference elements which are arranged on cards; the said reference elements being disposed at least on two cards in the same manner, whereby one card represents the combination of the reading device, whereas the other card has to be inserted in the reading device from the outside on provoking a consent signal which actuates the opening mechanism.

According to a further characteristic of the present invention, the identifying reference elements with which the cards are provided, are perforated or transparent, and coincide with photoelectric components or the like of reading units.

According to another characteristic of the present invention, the reading units have identical phototransistor matrixes and a source of light is provided between the reading units in order to permit them to be activated.

BRIEF DESCRIPTION OF THE DRAWINGS

The invention will be better understood from the following specification set forth as an example not restricting the invention itself, as well as from the accompanying drawings in which.

DETAILED DESCRIPTION

With reference to the accompanying drawings, number 1 denotes a mother-card, whereas number 2 indicates a daughter-card, which cards are inserted from the inside and from the outside of the reading device respectively, as described below.

Figure 1:
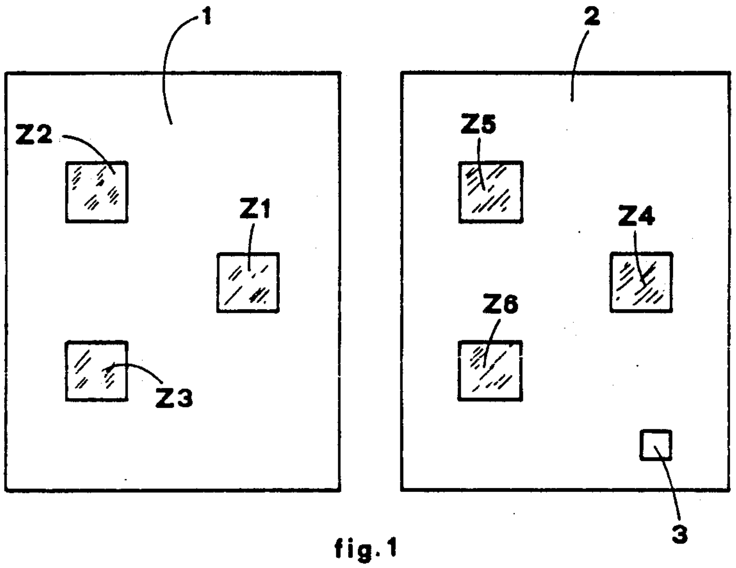
FIG. 1 is a schematic plan view of the cards according to the present invention.

The cards 1 and 2 are provided with several identifying reference elements or tags, which are transparent in this case, and are indicated with Z1, Z2 and Z3 in the card 1, and with Z4, Z5 and Z6 in the card 2 (see FIG. 1). The number and particular disposition of the said tags give the opening combination, number and disposition of the tags being identical in both cards. However this matrix-key is only one of the several matrix-keys which may be employed.

Figure 2:
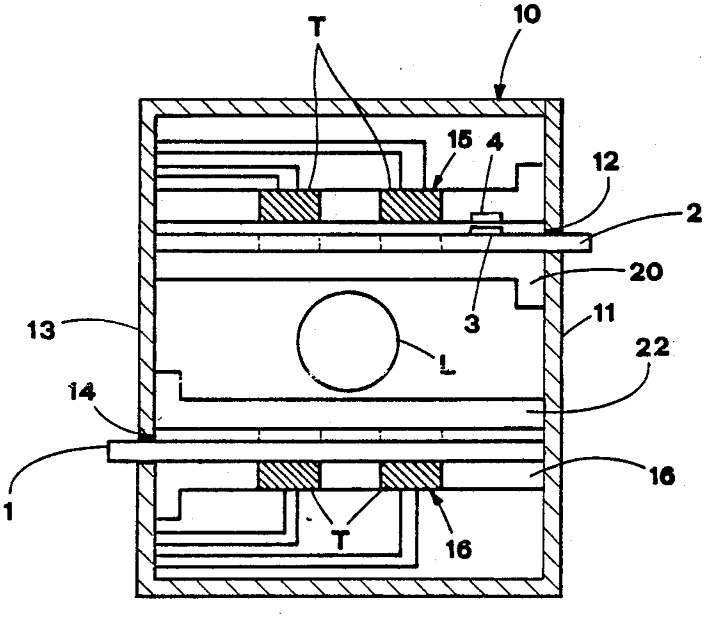
FIG. 2 is a partial section of the reading devices with the cards inserted for opening the door.

Moreover, the card 2, inserted from the outside, has a sensitizer 3. The purpose of the sensitizer 3 is to activate the reading device, as described below. As it appears from FIG. 2, the reading device is housed in a box 10.

Figure 3:
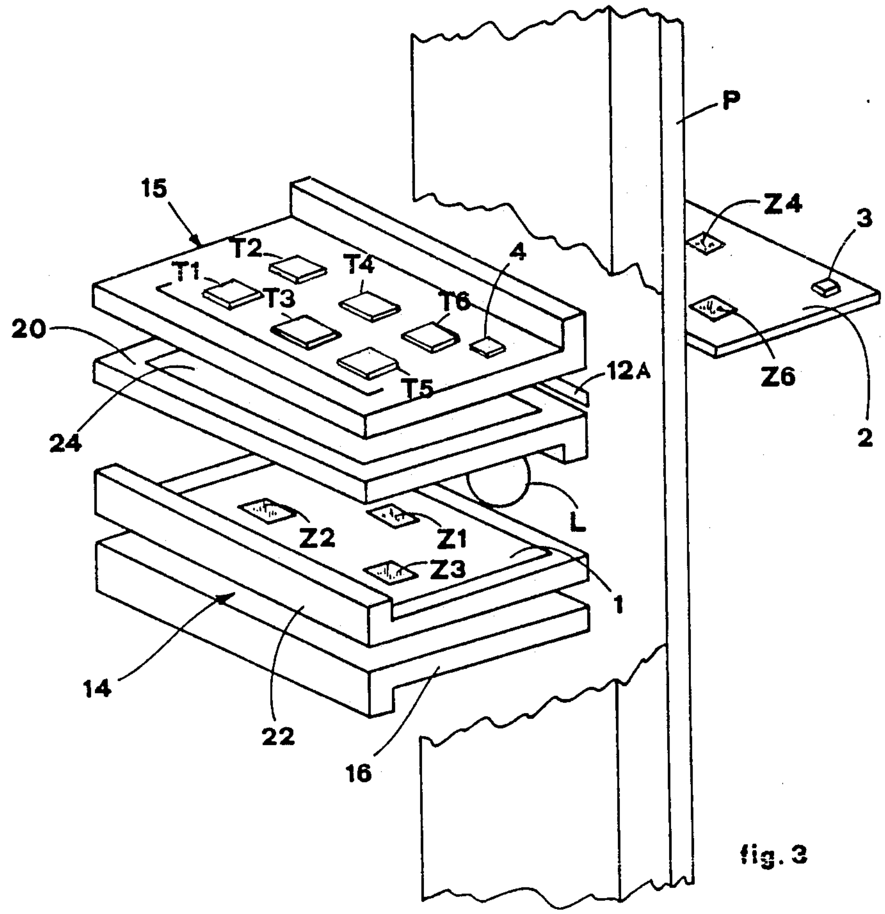
FIG. 3 is a schematic, perspective view of a system which is the subject of the present invention.

A front wall 11 of the box 10 is to be fitted on the inner side of a door P (FIG. 3). The front wall 11 of the box 10 has a slit 12 which corresponds to a slit 12A of the door P. The daughter-card 2 may be inserted through the said slits 12 and 12A. A back wall 13 of the box 10 has a further slit 14 through which the mother-card 1 may be inserted. The slit 14 is accessible only from the inside of the door P. Reading units are placed in the upper part and in the lower part of the box 10 respectively. The reading units may be, for instance, two series of phototransistors or the like, and the transparent tags of the cards have to exactly correspond with the phototransistors themselves. More precisely, upper phototransistors 15 are disposed over the inserted card 2, whereas in the lower part phototransistors 16 are disposed just under the inserted card 1. A source of light L is provided between the cards 1 and 2 in the middle of the box 10.

The box 10 is mounted on the inner side of the door P, so that the slit 12 corresponds with the slit 12A of the door itself, the slit 12A having the same size as the slit 12.

In order to determine the combination for opening the door, it is sufficient to insert the mother-card 1 through the slit 14. When the second card 2 is introduced in the same manner through the slit 12 from the outside, the sensitizer 3 of the card 2 activates a consent phototransistor 4 which, in its turn, activates the source of light L and all the reading elements. In fact, the activated source of light L emits light rays which pass through the transparent tags Z1, Z2 and Z3 of the card 1, and activate the corresponding phototransistors 16, arranged in the lower part of the reading device. At the same time, the rays of the source of light L pass through the transparent tags Z4, Z5 and Z6 of the card 2 and activate the corresponding phototransistors 15, arranged in the upper part. Then, the phototransistors 15 and 16 emit signals and in this reading system, each logical unit receives a series of signals from the phototransistors 15 or 16. If the transparent tags of the card 1 correspond with the transparent tags of the card 2, the signals emitted by the phototransistors 16 correspond with the signals emitted by the phototransistors 15, so that the mechanism for opening the door P is actuated. When the card 2 is drawn back through the slit 12, the opening mechanism stops.

In FIG. 3 there is a practical example for mounting the box 10 on the door P.

In the present case, bearing plates 20 and 22 are provided for supporting the cards 1 and 2. Each plate has a middle window 24 which permits the light of the source L to pass through.

In order to make the advantages of the method according to the present invention clearer, now a practical employment of the reading device on the control system using a strong-box placed for instance in a hotel room, will be described. When the guest of the hotel has arrived, he is given a pair of cards 1 and 2 having the same combinations of transparent tags. The strong-box is open and the guest can introduce the card 1 in the relative bearing plate 22 through the slit 14. Once the door of the strong-box has been closed, the electronic units will operate to open the door only if the corresponding card 2 is introduced in the slit 12 through the slit 12A of the door P. When the guest has finished his stay, he has to open the strong-box and return the pair of cards. The next guest of the room in question will be given a new pair of cards.

Figure 4:
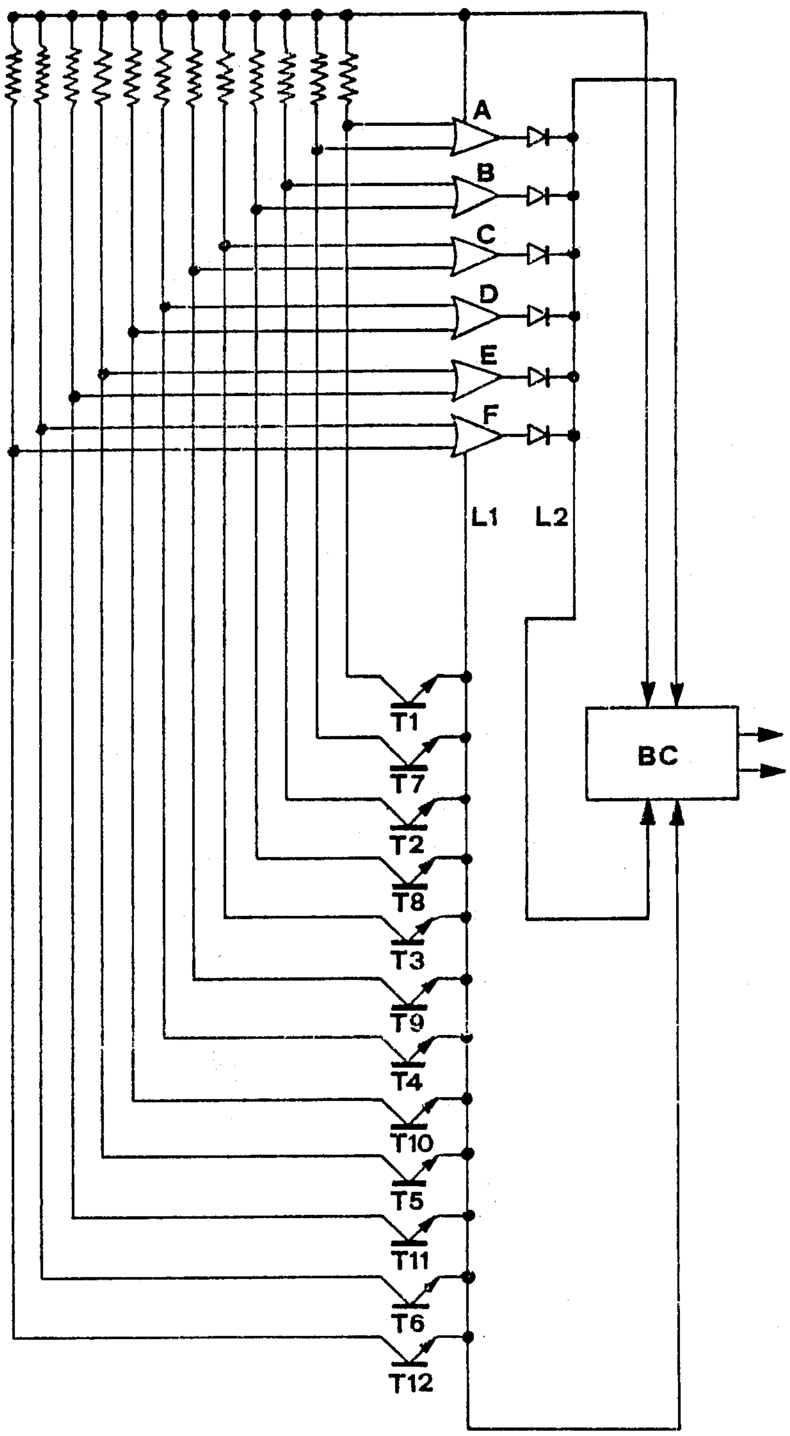
FIG. 4 is a simplified circuit diagram of a device according to the present invention.

A simplified circuit diagram is represented in FIG. 4. This circuit processes a signal for the described device. The phototransistors of the mother-card 1 are indicated with T1, T2, T3, T4, T5 and T6, while the phototransistors of the daughter-card are indicated with T7, T8, T9, T10, T11 and T12. One electrode of each phototransistor is connected with a common line L1, whereas the other electrode of each phototransistor is connected in parallel with a relative AND gate A, B, C, D, E, F, so that to connect T1 and T7 with the AND gate A, T2 and T8 with the AND gate B, T3 and T9 with the AND gate C, T4 and T10 with the AND gate D, T5 and T11 with the AND gate E and T6, T12 with the AND gate F.

The outputs of the AND doors A, B, C, D, E and F are connected with a common line L2. The aforesaid lines reach the processing control block BC of the circuit. When each AND gate receives the signals through its two inputs, each AND gate emits a signal in its turn, the last signal being then processed by the block BC in order to actuate the opening of the door.

From the above description it appears that with the method according to the present invention, it is possible to change the combination in a very short time, without the help of a skillful person, and there is the possibility of getting several personal combinations which can be changed easily at any moment. Moreover, the greater the number of the transparent tags, the greater the number of the combinations.

It is obvious that the above-descripted device may be modified in various manners by an expert in this field, without exceeding the method according to the invention. For instance, the cards may be provided with holes in stead of the transparent tags, or magnetic bands may be used, and in this case the reading device must be magnetic.

We claim:

1. A method of opening a door which can be opened by a signal, comprising:
   - providing a mother card having a first pattern of readable elements;
   - providing a daughter card having a second pattern of readable elements, which is substantially the same as the first pattern of readable elements;
   - inserting the mother card into a reading unit accessible from one side of the door;
   - inserting the daughter card into a reading unit accessible from an opposite side of the door;
   - operating each reading unit to read the first and second patterns; and
   - comparing the read first and second patterns and, if they correspond to each other, generating a signal for opening the door, whereby different sets of mother and daughter cards, having the same first and second patterns, can be used in the same reading units.

2. A method according to claim 1, including providing the readable elements in the mother and daughter cards as openings through the mother and daughter cards.

3. A method according to claim 1, including providing the readable elements in the mother and daughter cards as transparent areas in the mother and daughter cards.

4. A method according to claim 1, including providing a pattern of photoelectric sensors in each of the reading units and illuminating mother and daughter cards in the reading units to activate the photoelectric sensors, the photoelectric sensors being connected to a circuit for comparing the first and second patterns of readable elements.

5. A method according to claim 1, including providing a consent element on the daughter card and providing a consent element reader in the reading unit for reading the daughter card, the consent element reader activating the reading units for the mother and daughter cards.

6. A method of opening a door which can be opened by a signal, comprising:
   - inserting a combination carrying member into a reader on the inside of the door;
   - inserting a key carrying member into the reader on the outside of the door;
   - comparing signals received in the reader from the combination carrying member and the key carrying member, and if the signals correspond to each other, indicating correspondence between patterns on the combination carrying member and key carrying member, issuing the signal for opening the door.

7. An apparatus for opening a door having a locking mechanism which can be unlocked by a signal, comprising:
   - a mother card having a first pattern of readable elements;
   - a daughter card having a second pattern of readable elements, the first and second pattern being substantially the same;
   - reading means for detachably receiving the mother card and the daughter card, and for reading the first and second patterns thereon; and circuit means connected to the reading means for comparing the first and second patterns, and, if the first and second patterns correspond to each other, issuing the signal for opening the door.

8. An apparatus according to claim 7, wherein said reading means includes a separate reading unit for said mother card and for said daughter card, said reading unit for said mother card receiving said mother card from one side of the door, and said reading unit for said daughter card receiving said daughter card from the opposite side of the door.

9. An apparatus according to claim 8, wherein each readable element comprises an opening through one of said mother and daughter cards.

10. An apparatus according to claim 8, wherein each of said readable elements comprises a transparent element in one of said mother and daughter cards.

11. An apparatus according to claim 10, wherein said reading unit for each of said mother and daughter cards, includes a plurality of photosensitive elements, positioned for receiving light through one of said readable elements, and a source of light for illuminating said readable elements.

* * * * *